(12) United States Patent
Finkelstein (10) Patent No.: US 7,295,920 B2
(45) Date of Patent: Nov. 13, 2007

(54) APPARATUS AND METHOD FOR CAR RELOCATION AND PARKING TIMER

(76) Inventor: Yoram Finkelstein, 300 E. 4th St., Apt. 3C, New York, NY (US) 10009

( * ) Notice: Subject to any disclaimer, the term of this patent is extended or adjusted under 35 U.S.C. 154(b) by 0 days.

(21) Appl. No.: 10/982,712

(22) Filed: Nov. 4, 2004

(65) Prior Publication Data

US 2006/0092002 A1 May 4, 2006

(51) Int. Cl.
*G01C 21/00* (2006.01)
(52) U.S. Cl. .................. 701/207; 701/213; 701/300; 340/426.19; 342/357.06; 342/357.08
(58) Field of Classification Search ............ 701/200, 701/201, 207, 213, 300; 340/988, 990, 995.18, 340/426.19; 342/357.01, 357.06, 357.07, 342/357.08, 357.09, 357.13
See application file for complete search history.

(56) References Cited

U.S. PATENT DOCUMENTS

| | | | |
|---|---|---|---|
| 6,275,141 B1 | 8/2001 | Walter | |
| 6,587,052 B1 | 7/2003 | Flick | |
| 6,983,514 B2 * | 1/2006 | Lu et al. ................. | 16/342 |
| 2002/0181333 A1 * | 12/2002 | Ito et al. ................. | 368/21 |
| 2003/0081935 A1 * | 5/2003 | Kirmuss ................. | 386/46 |

FOREIGN PATENT DOCUMENTS

EP        1 564 690 A2  *  8/2005

* cited by examiner

*Primary Examiner*—Gertrude A. Jeanglaude
(74) *Attorney, Agent, or Firm*—Ariel S. Bentolila; Bay Area IP, LLC (57) ABSTRACT

A method and portable device is provided to assist a person to relocate their parked car and track the time the car should be attended to. A device embodiment includes a car location recording module and a car location playback module. The car location recording module is operable to record a car location in response to the engagement of a (possibly automatically generated) car related signal, which car related signal is engaged proximal to when the car is vacated. The car location playback module plays back the car location recorded by the recording module. Some embodiments further include means for keeping time, such that the location recording module is configured to also record the date and time of when the car location was recorded. Means for managing parking time are also provided for alerting the person that a certain time is eminent or has past, and/or alerting the person that a certain elapsed time is eminent or has past.

32 Claims, 6 Drawing Sheets

APPARATUS AND METHOD FOR CAR RELOCATION AND PARKING TIMER

FIELD OF THE INVENTION

The present invention relates generally to car relocation and personal stopwatch to monitor parked cars. More particularly, the invention relates to car relocation systems and methods integrated into car related remote controls.

BACKGROUND OF THE INVENTION

It is a common experience to park ones car, only to return some time later and forget where it was parked. Examples of this problem include parking ones car at an unfamiliar parking location such as overnight or a few days street parking, a shopping center, a sport stadium, long term parking in an airport, etc. Conventional approaches provide a remote control that may be activated in proximity of the parked car, whereby the car will respond by indicating its location usually audible or by light signaling. However, such approaches are not practical when the car is not within a line of sight or audible distance.

Other conventional techniques provide a voice recording device that the user is expected to use to record the parking location information. Unfortunately, such techniques are often extremely inconvenient and hard for the user to remember to use.

Another routinely experienced parking problem is when the parking space has some kind of time limit or cost. It is common, especially in city parking situations, that drivers park their car next to a parking meter or restricted parking spot on the street where they have to move the car at a certain time. For example: no parking 11AM-2PM. It is also very common that drivers will forget to return to the car before the meter or time limit expires, thereby avoiding a ticket or being towed away. Conventional devices do not conveniently alert the user when the parked car should be moved.

In view of the foregoing, there is a need for improved techniques for the relocation of parked cars. It would also be desirable is such improved techniques also conveniently provided a parking time limit monitoring/alert system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1b illustrates a side view of portable car relocation device of FIG. 1a;

Unless otherwise indicated illustrations in the figures are not necessarily drawn to scale.

SUMMARY OF THE INVENTION

To achieve the forgoing and other objects and in accordance with the purpose of the invention, a variety of portable car relocation and parking timer techniques are described.

In a first aspect of the present invention a portable device is provided to assist a person to relocate their car after parking it. In second aspect of the present invention an integrated parking timer is provided to assist a person to time when they should return to their parked vehicle to, for example, avoid parking violations.

One device embodiment of the first aspect includes a car location recording module, a car location playback module, and a controller module to control recording in the car location recording module and playback in the car location playback module. The car location recording module is operable to record a car location in response to the engagement of a (possibly automatically generated) car related signal, which car related signal is engaged proximal to when the car is vacated. The car location playback module plays back the car location recorded by the recording module. Some embodiments further include a prompting system to request the person record by voice the location of the car into the car location recording module when the user presses the door lock or alarm arming button on their car's remote control, and plays back the voice message upon request by the user. There are many ways of recording and communicated the car's location to the user.

Some alternative ways of recording the car's location include, but is not limited to, taking a picture of the car's location, and storing the car's GPS location. Some alternative ways of communicated the car's location include, but is not limited to, speech, textual or graphic displays.

In a second aspect of the present invention alternative embodiments of the present invention further include means for keeping time, such that the location recording module is configured to also record the date and time of when the car location was recorded. Means for managing parking time are also described for alerting the person that a certain time is eminent or has past, and/or alerting the person that a certain elapsed time is eminent or has past.

In yet another alternative embodiment of the present invention, means are provided a portable device that assists in car relocation, which includes means for recording a car location, means for playing back the car location recorded by the car location recording means, and means for controlling the car location recording and playback means. Some embodiments further include means for prompting the person to record the location of the car into the car location recording means, and/or means for keeping time to, for example, record the date and time of when the car location was recorded, and/or alert the person that a certain time is eminent or has past, and/or alert the person that a certain elapsed time is eminent or has past.

A method is also provide for the relocation of a car by a person, an embodiment of the method includes the steps of recording a car location in response to the engagement of a car related signal, the car related signal being engaged proximal to when the car is vacated; and communicating the recorded car location to the person. Some embodiments of the method further include the step of, in response to the engagement of a car related signal (e.g., a door lock signal), prompting the person to say and record the location of the car, by, for example, recording of the car location is by way of recording the voice of the person saying the car location, whereby the voice recording is played back upon request by the user. Alternatively, the recording of the car location may be by way of a GPS system that automatically records the approximate geographic coordinates of the car or nearest cross street location to the car, or by taking a picture of and later displaying the parking location upon user request.

Yet other method embodiments of the present invention may further include the step of recording the date and time of when the car location was recorded, and/or alerting the person that a certain time is eminent or has past, and/or alerting the person that a certain elapsed time is eminent or has past.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. Therefore, specific details disclosed herein are not to be interpreted as limiting, but rather as a basis for the claims and as a representative basis for teaching one skilled in the art to employ the present invention in virtually any appropriately detailed system, structure or manner.

Some general aspects of a portable car relocation device configured according to the present invention includes the following features:
1. Prerecorded programmable message or signal announcement;
2. Message recorder; and
3. Message playback.

Figure 1A:
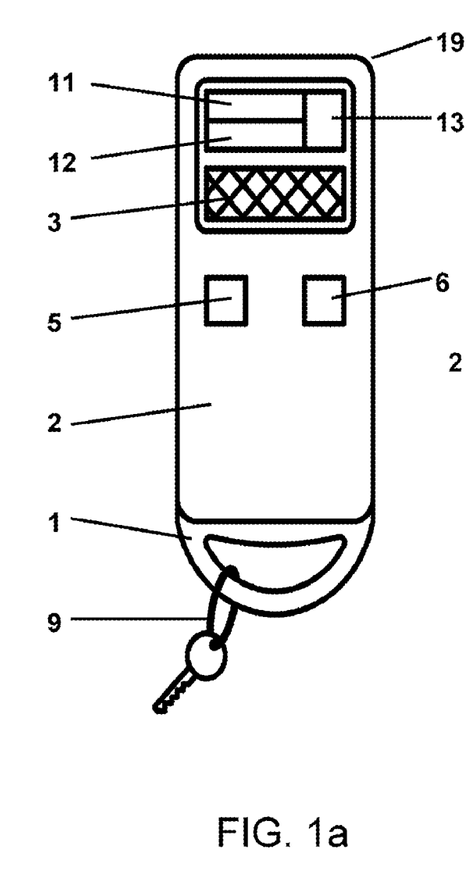
FIG. 1a illustrates a front view of an exemplary implementation of the first embodiment in the closed position.
Figure 1B:
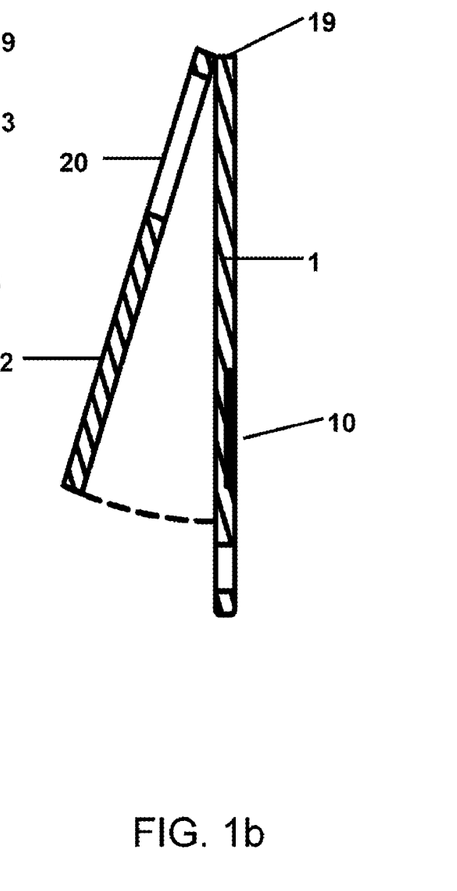
Figure 2:
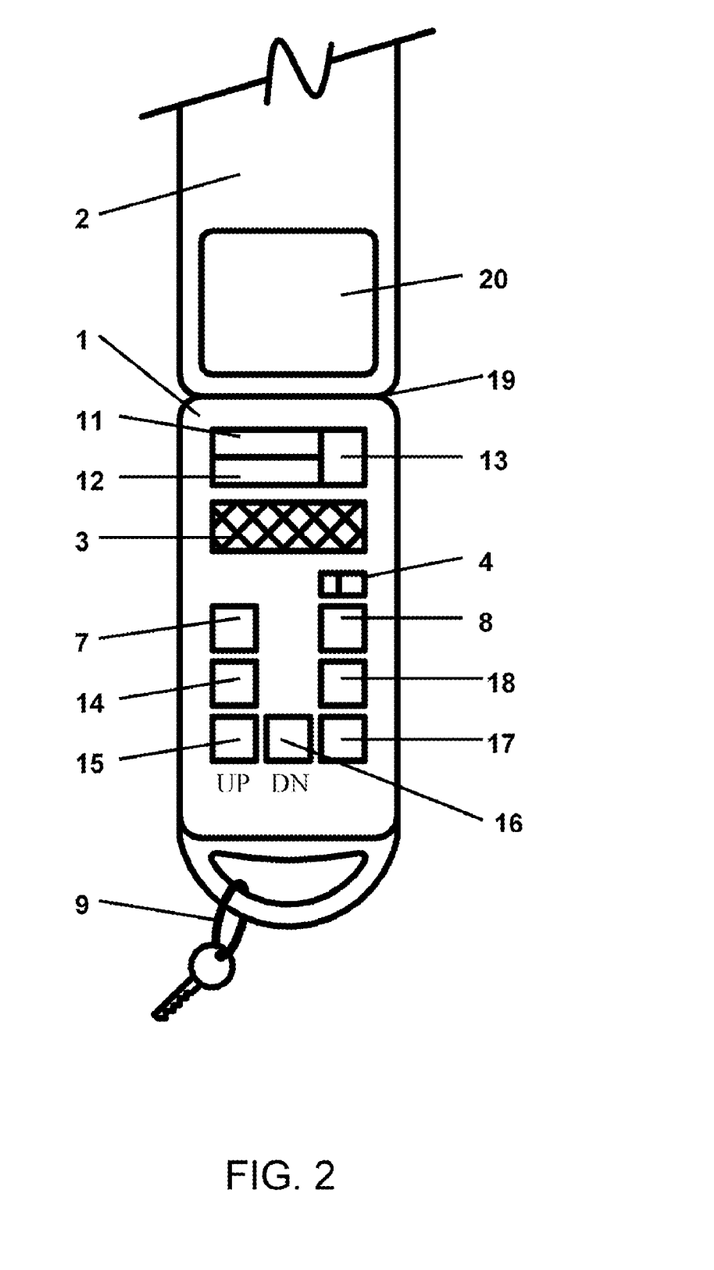
FIG. 2 illustrates a front view of the first embodiment in the open position.

In a first embodiment of the present invention, conventional devices implementing the foregoing aspects are integrated and enhanced into one convenient unit to achieve new capabilities and features not otherwise possible or practical. The first embodiment of the present invention is based on a car-doors lock/unlock remote control that includes message recorder/playback and timekeeper modules. FIG. 1a illustrates a front view of a portable car relocation device 100 in the closed position according to an exemplary implementation of the first embodiment. FIG. 1b illustrates a side view of portable car relocation device 100. FIG. 2 illustrates a front view of the first embodiment in the open position. Referring to FIGS. 1a, 1b, and 2, car relocation device 100 is constructed of a structural case 1 and a flip open cover 2 connected thereon by a hinge 19, and includes the necessary interface components to implement a conventional car door locks remote control and message record/playback control. Flip open cover 2 has a cover opening 20 to reveal components upon the front surface of structural case 1. Structural case is designed to contain a suitable battery 10, which may or may not be conveniently accessible by the end user.

Message record/playback interface components include a speaker/microphone 3, a volume control 4, a button to record messages 7, and a button for security access code and to playback messages 8. Car door locks remote control components includes a car doors lock button 5, a car doors unlock button 6, and a key ring 9.

Timekeeper module interface may include suitable display and input components such as, by way of example and not limitation, a display area 11 suitable for displaying time (e.g., an LCD), alarms and date information, a stopwatch display area 12, a mode display area 13, and time/alarm setting control buttons such as quantized time incrementers 15, 16 and 17.

Various user interface buttons may also be provided to enable to the user to more efficiently interact with the present invention. For example, an "undo" button 18 may enable the user to undo last entry or be a "back" button. Another typical button includes a mode button 14 that when pressed switches between available functions, as will be described by way of example in some detail below.

In the first embodiment, certain car relocation and/or parking timer aspects of the present invention are triggered when the user presses car doors lock button 5. For example, implementation usage scenario of the car relocation aspect of the present invention is as follows. When the user leaves the car, he/she presses car doors lock button 5 to lock the car doors, which also activates a prerecorded message that asks, for example, the user to record a statement of where the car is parked. Suitable prompts include "Please tell me where you parked your car" or "I'm parked at" or the user's own prerecorded personal statement, etc. To record a new prompt or message, the user presses and holds record button 7 until the message has been recorded. The new message is recorded over the previous message. This message, for example, could be "300 East $4^{th}$ Street" if parked on the street or "Second floor area 215" if parked in an airport" etc. The present embodiment will preferably automatically add the time and date of when the car was parked. However, this automatic time/date stamp may be an optional feature or may be excluded all together depending on the needs of the application. The time and date stamp may be helpful when drivers park their car on the street for a few days at a time and possibly forget when and/or where they parked their car, which otherwise often results in the user wandering on the street looking for their car. Instead, the present invention can help the user to efficiently find the car location by replaying their previously recorded message of the car's current location. That is, when the user goes back to his/her car, they will activate access/playback button 8. In a preferred embodiment, a valid security access code/password will have to be entered before the car's location message is played back. Other, or no, known security measures may be implemented instead.

Access/playback button 8 is pressed twice in the present embodiment—once to enter the code/password, and a second time to play the message. If the password is correct the second push will playback the message of the location of the car. Typical playback messages include "car was parked at 300 East $4^{th}$ Street on Jul. 4, 2004," or car was parked at "the second floor area 215 on Jul. 21, 2004". The code/password is usually desirable because if the device will be lost and found by someone other than the car owner/driver, the car could be easily stolen. The code/password can be programmed by the user. Any suitable password protection system may be used. By way of example and not limitation, an alphanumeric keypad (not shown) or encoded button may be included to enable the user to key in their desired password, the code may be preset by the factory/vendor (e.g., the manufacture will provide a code to each device which must be entered by the user for access or to optionally change the password), a conventional voice recognition unit may be included to receive a spoken code, etc., or any other security scheme such as biometrics, etc. may be used. Those skilled in the art will readily recognize and implement multiplicity of suitable security approaches for use in the present invention.

The parking timer aspect of the present invention is optionally included into the first embodiment or in some alternate embodiment of the present invention the parking timer aspect may be implemented instead of the car relocation aspect. The parking timer aspect helps drivers to manage their parked car, thereby potentially saving money, time, and aggravation by reminding when their car has to be attended to. In many applications, the parking timer aspect of the present invention can more than pay for itself if it helps the user avoid getting one or two ticket.

The parking timer aspect of the present invention may be implemented in any number of suitable ways. In application where buttons are to be limited, a single mode select button 14 may be helpful to this end, whereby entering data into the present embodiment may be done in a similar manner as that for convention wrist watches. Some typical programming/usage modes may include, but is not limited to the following:

a. Time setup: e.g., entering hours and minutes.
b. Date Setup: e.g., Day of week, Day of month, Month, and Year.
c. Alarm Clock setup: e.g., Day of week, Day of month, Month, and Year.
d. Record password: e.g., enter factory pre-assigned digits marked on each button to change the password.
e. Record announcement associated with a "lock" function.
f. Change default setting of announcement and/or prompt; e.g., "Please tell me where you parked your car", "I am parked at", 3-4 tunes melody, a beep sound, or user recorded announcements.
g. Setup time remaining until meter expires; e.g.:
  1. Setup indicator for time remained by a:
    a. Beep
    b. Vibrate
    c. Flashing light
  2. Setup indicator for time expired by:
    a. Beep
    b. Vibrate
    c. Flashing light
h. Stopwatch and alarm clock "snooze" on/off; e.g., the snooze could be set to go off in about 2 to 3 minutes intervals.

One implementation of the parking timer aspect of the present invention may be carried out as follows. By way of example and not limitation, when a user parks at a time restricted zone or a parking meter he/she can press three timer setting buttons with predetermined times of 5 minutes (e.g., control button 15), 10 minutes (e.g., control button 16) and 1 hour (e.g., control button 17). The countdown, or stopwatch, time set by these three buttons, for example, makes the process of entering the time on the stopwatch relatively convenient and quick. This stopwatch time is typically set to the time left until the user has to come back to the car. In some embodiments, the "undo" button 18 may be provided to undo the last entry in case a mistake is made in entering the time.

The separate timer setting buttons provide direct and convenient access to control the stopwatch without using a mode function, which makes the registration of the time less convenient. In addition, the separate timer setting time buttons may be implemented in a multiplicity of suitable shapes, including, but not limited to, round, square, triangle; likewise, they may provided with a suitable textures or different colors to, for example, facilitate "blind" use during the day or at night. However, alternative embodiments may set the stopwatch time in any known way. For example, when a user parks next to a meter and pays for one hour he/she has to press the 1 Hr button, whereby the stopwatch starts to run back to zero. Another example is, if forty five minutes have registered on the meter the user quickly presses four times the 10 Min. button and presses one time the 5 Min. button to register forty five minutes on the stopwatch. If a mistake is made pressing the 10 Min. button five times instead of four, the user can use the "back" button to go back so that forty Min. will register and not fifty then adding the five minutes as needed. Before the stopwatch runs down to show zero time left, it may signal a warning sound or vibration to the user. This warning signal may be about five to ten minutes before time will expire. The five to ten minutes could be programmed by the user. When the stopwatch will reach zero it may also make a sound, flash a light, or vibrate to alarm the user that time has expired. The early warning signal (e.g., a ten minute warning) is preferably selected by the user such that it gives the user enough time to walk back to the car to, for example, add money to the meter or drive away. Similarly, for example, if the driver parks the car at 1 PM and there is a traffic sign that indicates that there is no parking between 4PM-7PM, he/she will press the 1 Hr. button three times to indicate on the stopwatch that three hours are left before the car has to be moved. In this instance, the early warning signal may be activated (e.g., a five to ten minutes warning) and when the stopwatch will reach zero it will signal the user. Additionally, if the driver has to attend to the car after a longer period than what the stopwatch feature provides (e.g., for several hours) he/she may instead use the alarm clock feature as a reminder. In some embodiments, when using the alarm clock feature the driver may be provided a multiplicity of early warning signals before the time has expired; e.g., three warning signals: a one hour warning, 30 minute warning, and a 10 minute warning.

Figure 3:
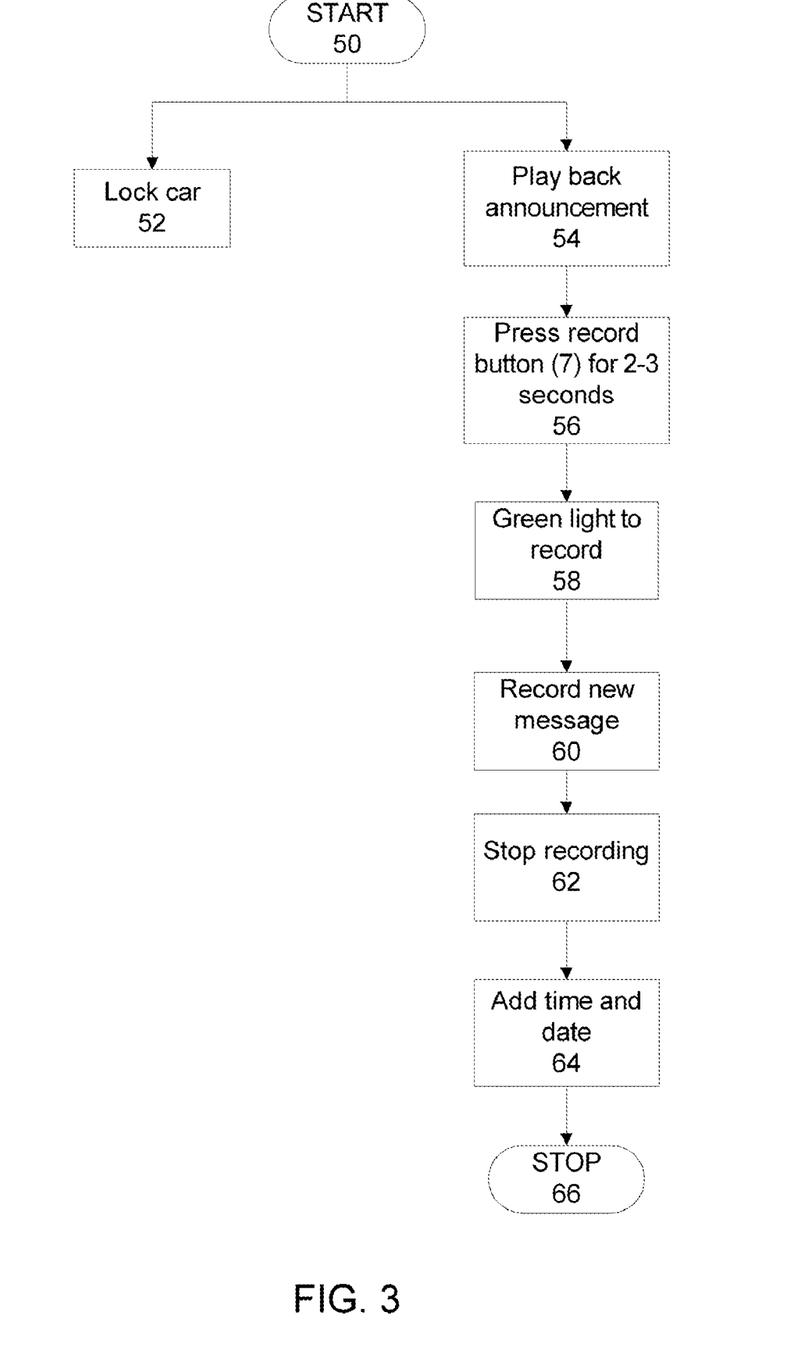
FIG. 3 illustrates an exemplary flowchart for message recording according to an embodiment of the present invention.

FIG. 3 illustrates an exemplary flowchart for message recording according to an embodiment of the present invention. By way of example, and not limitation, after parking the vehicle, the user will use the car remote control to lock up the car doors or some other car related function including, but not limited to, engaging a security alarm system, etc. Referring to FIGS. 1a, 1b, 2, and 3, at Step 50, pressing car doors lock button 5 (or any car related button pressed upon leaving the car) will perform two functions at the same time, one process is to lock the car doors at Step 52 by conventional means and a parallel Step 54 which plays back the prerecorded announcement asking the user to record a message of where the car is parked. The user then will press record button 7 to record that message. Pressing record button 7 continuously, for example about 2-3 seconds, will tell a conventional embedded CPU to begin the record mode at Step 56. This may also be indicated by a green color lamp and/or a flashing light 58 on the mode display area 13. Continuously holding the record button 7 while in the record mode, the new message will be recorded over the previously recorded message at Step 60 and store the new message in the conventional semiconductor memory until a new message will be recorded over it. Releasing record button 7 will stop the manual recording process at Step 62. When the record button 7 is released, the CPU may automatically add the time and date at Step 64 to the message, which will be part of the playback message. The message recording process ends at Step 66. Those skilled in the art will readily recognize that many alternate steps may be added, steps removed, or step order swapped in a multiplicity of suitable ways. Moreover, the triggering of the present message recording process may be automatically initiated in a multiplicity of alternative ways, as those skilled in the art will readily appreciate. By way of example, and not limitation, beyond pressing the door lock or arm alarm button on a car/security remote control, known wireless signaling means may be installed into the car to signal, at the appropriate time, an alternative embodiment of the present invention to prompt the driver at Step 54 and proceed thereon as described above. In some embodiments of the present invention, a GPS module will automatically will register the location of the car on the present device in response to turning off the car engine.

Figure 4:
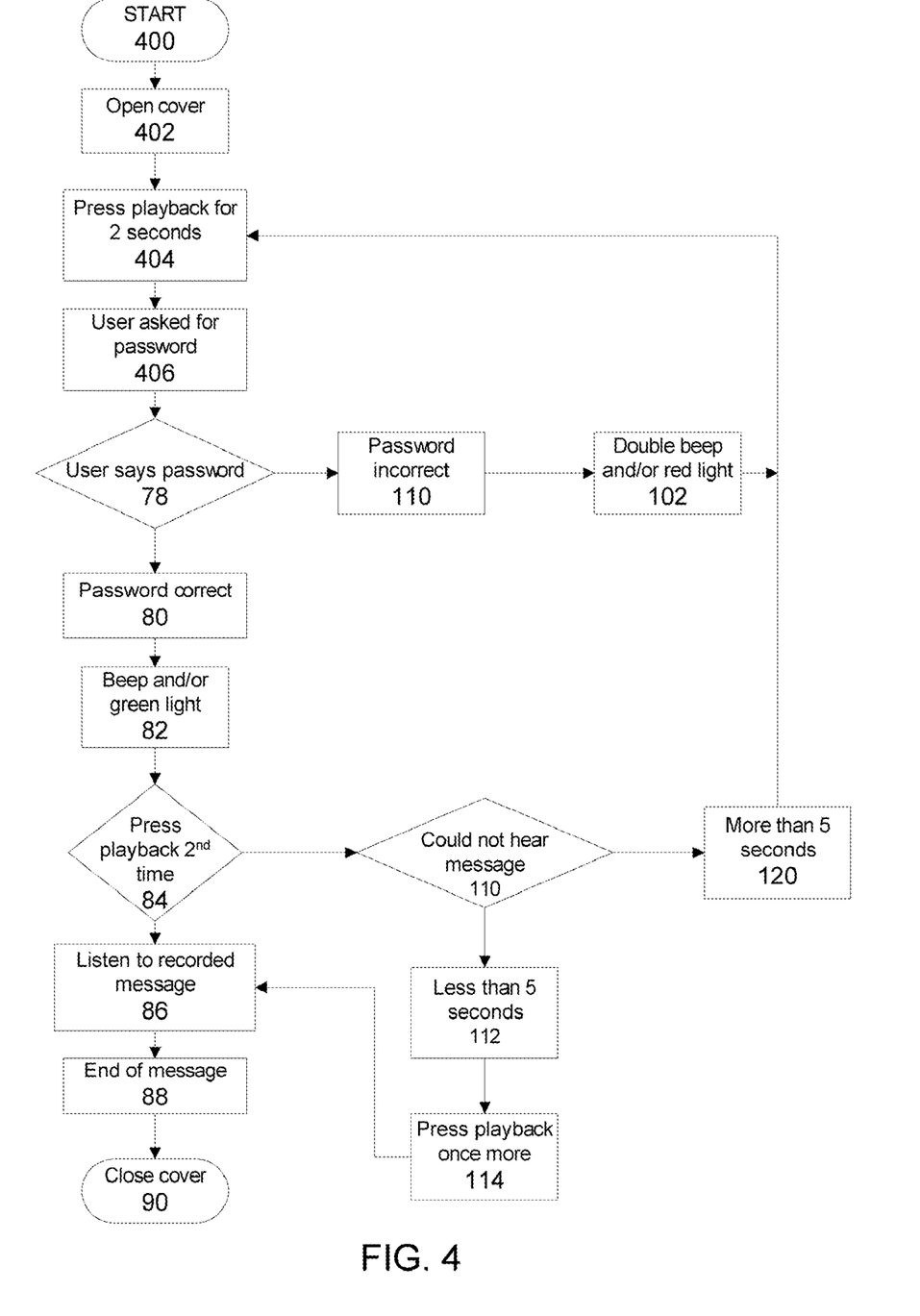
FIG. 4 illustrates an exemplary flowchart for message playback according to an embodiment of the present invention.

FIG. 4 illustrates an exemplary flowchart for message playback according to an embodiment of the present invention. Referring to FIGS. 1*a*, 1*b*, 2, and 4, when the user returns to the vehicle at Step 400, he/she opens the device cover at Step 402 then presses playback button 8 to playback the recorded message. When pressing playback button 8 at Step 404 continuously, for example 2 seconds, they will be asked for their password at Step 406 (or any suitable security measure), for example "tell me your password" or "password please". The user will then say or enter the password at Step 78. If the password is correct at Step 80 an acceptance signal (e.g., a beep and or a green light) may, at Step 82, signal to the user that the password was correct and to press playback button 8 for a second time at Step 84 to listen to the message at Step 86. The recorded message where the car was parked together with the time and date will thereafter be retrieved. The message playback process ends at Step 88. The user typically will then close the present device cover at Step 90. In some embodiments, the closing of the cover will automatically end the message playback process at any time therein.

If the password is incorrect at Step 100, a signal to the user will indicate the invalid password; e.g., by a red light and/or double beep at Step 102. The user could then restart this process by again pressing and holding playback button 8 (e.g., for about 2 seconds) at Step 74.

If the user could not hear the message for any reason at Step 110, for example, because of a distraction or background noise, he/she, within a certain amount of time, as measured at Step 112, may press playback button 8 once more at Step 114 (e.g., within 5 seconds) to listen to the message again at Step 86. Alternatively, after a certain amount of time passes (e.g., more than 5 seconds) at Step 120, he or she could start this process again by at Step 404. Those skilled in the art will readily recognize that many alternate steps may be added, steps removed, or step order swapped in a multiplicity of suitable ways.

Figure 5:
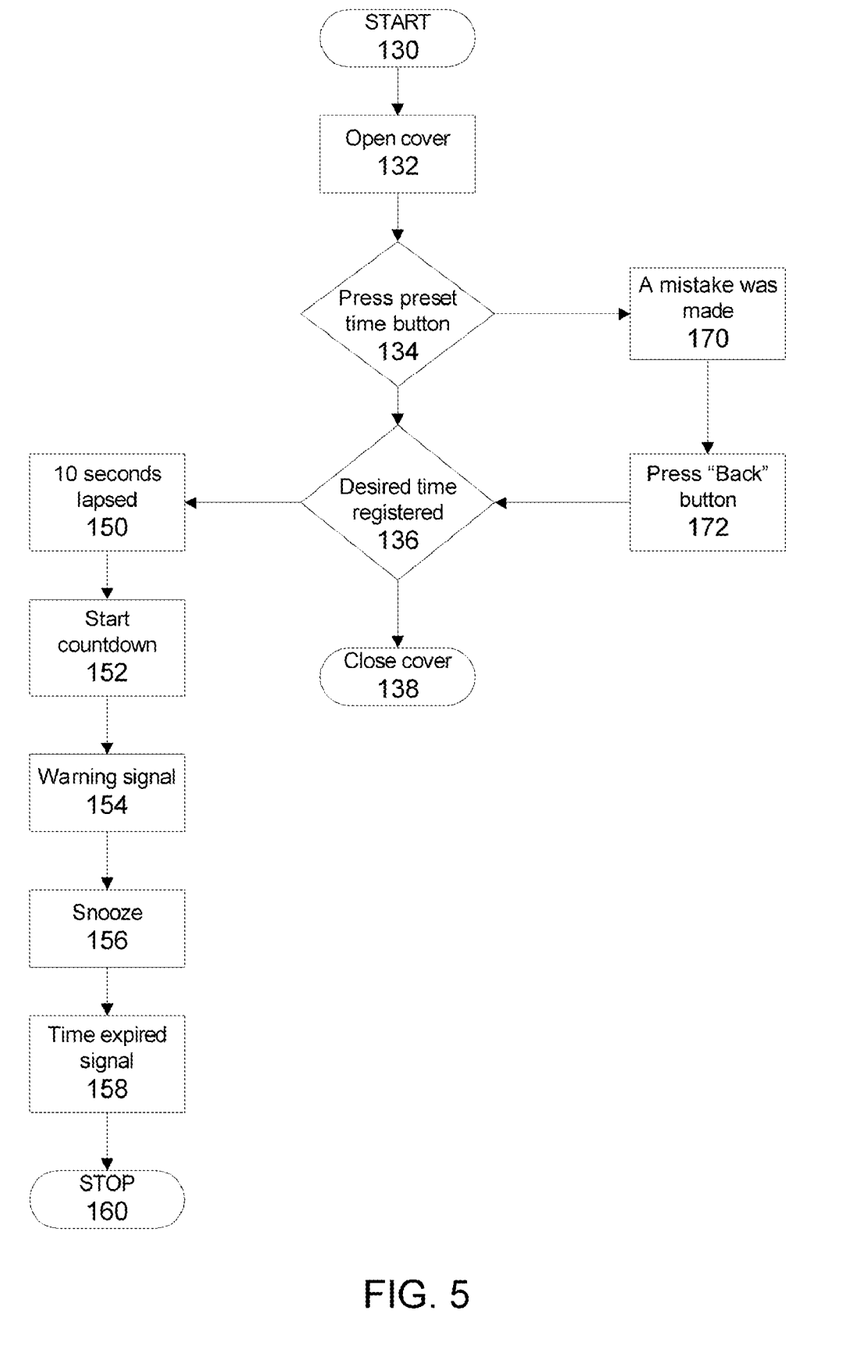
FIG. 5 illustrates an exemplary flowchart for configuring the stopwatch timer according to an embodiment of the present invention.

FIG. 5 illustrates an exemplary flowchart for configuring and using the stopwatch timer according to an embodiment of the present invention. The stopwatch timer aspect of the present invention may be configured to help the vehicle operator set up a parking timer reminder when he or she should return to their vehicle parked in a time-limited spot; e.g., the car has to be moved because of a parking meter that has 2 hours remaining on it, street parking regulations such as if the vehicle is parked at 1 PM and there is no parking between 3-7 P.M. Referring to FIGS. 1*a*, 1*b*, 2, and 5, in the present embodiment, the user begins the stopwatch timer setting at Step 130. The user will then open flip open cover 2 at Step 132 and at Step 134 input the countdown time to the system, by, for example, pressing any combination of the time/alarm setting control buttons 15, 16 & 17. In the present example, the user will press the five minutes button (e.g., control button 15) to register 5 min. on the stopwatch, the ten minutes button (e.g., control button 16) to register 10 minutes on the stopwatch, and the one-hour button (e.g., control button 17) to register 1 hour on the stopwatch. Hence, the user may use any combination of the time/alarm setting control buttons 15, 16 and 17 to conveniently register any time required. Those skilled in the art will recognized a multiplicity of alternative and suitable approaches to implement the inputting of the countdown time according to known principals, for example, similar to that of a wristwatch.

If a mistake is made, he/she may engage the undo feature (e.g., "undo" button 18) at Step 170 to undo the last entry at Step 172, whereby, the user can undo the last entries by pressing "undo" button once or more to correct the mistake and input the corrected time. For example, if 30 minutes is the countdown time to be set, the user could press ten minute button 16 three times to register 30 minutes in the countdown timer; wherein, if by mistake, for example, ten minute button 16 was pressed four times, instead of three times, registering 40 minutes the user may press "undo" button 18 once to reduce the registered time by 10 minutes, thereby registering desired time of 30 minutes.

Once the desired countdown time is correctly registered at Step 136, the use may then close flip open cover 2 at Step 138. A delay timer may be implemented at Step 150 (e.g., 10 seconds) after the last button was pressed to delay the start of the stopwatch counting down to zero at Step 152. The stopwatch timer thereafter begins to countdown from the registered time until the desired time has elapsed at Step 136 to attend back to the car. An optional warning signal may be initiated at Step 154 at a certain (manufacturer and/or user) programmable time before the stopwatch will reach zero (e.g., 5 and/or 15 minutes). Any suitable warning signal means may be implemented, including, but not limited to, sound such as a beep, vibration, or flashing light, for example. The warning signal is sometimes useful to provide the user know with an earlier time to decide whether to return to their parked car. Alternatively, at Step 156 the user could program the warning signal to snooze (e.g., repeat the warning signal every 2-3 minutes) after the initial warning signal. Upon expiration of the stopwatch at Step 158 a final 'time expired' signal is engaged. Typically, the final signal is noticeably different than the early warning signal so that the user may distinguish the identity of each. The user may actively cancel 'time expired' signal or the system may automatically cancel it after a certain amount of time, thereby ending the stopwatch timer process at Step 160. It should be appreciated that if it is inconvenient or impractical for the driver to use the stopwatch timer as a parking timer (e.g., maximum stopwatch time is too short, or it is too hard to calculate the countdown time to a fixed return time) then the alarm clock may be used instead by programming the exact time to jump to Step 154 to engage the warning signal and similarly proceed thereon. Those skilled in the art will readily recognized a multiplicity of signaling patterns may be implemented depending on the particular needs of the application; by way of example, and not limitation, when three warning signals may be played prior time expiration: at the one-hour mark, the 30-minute mark and the 10-minute mark. Those skilled in the art will readily recognize that many alternate steps may be added, steps removed, or step order swapped in a multiplicity of suitable ways while still being within the spirit of the present teachings.

Figure 6:
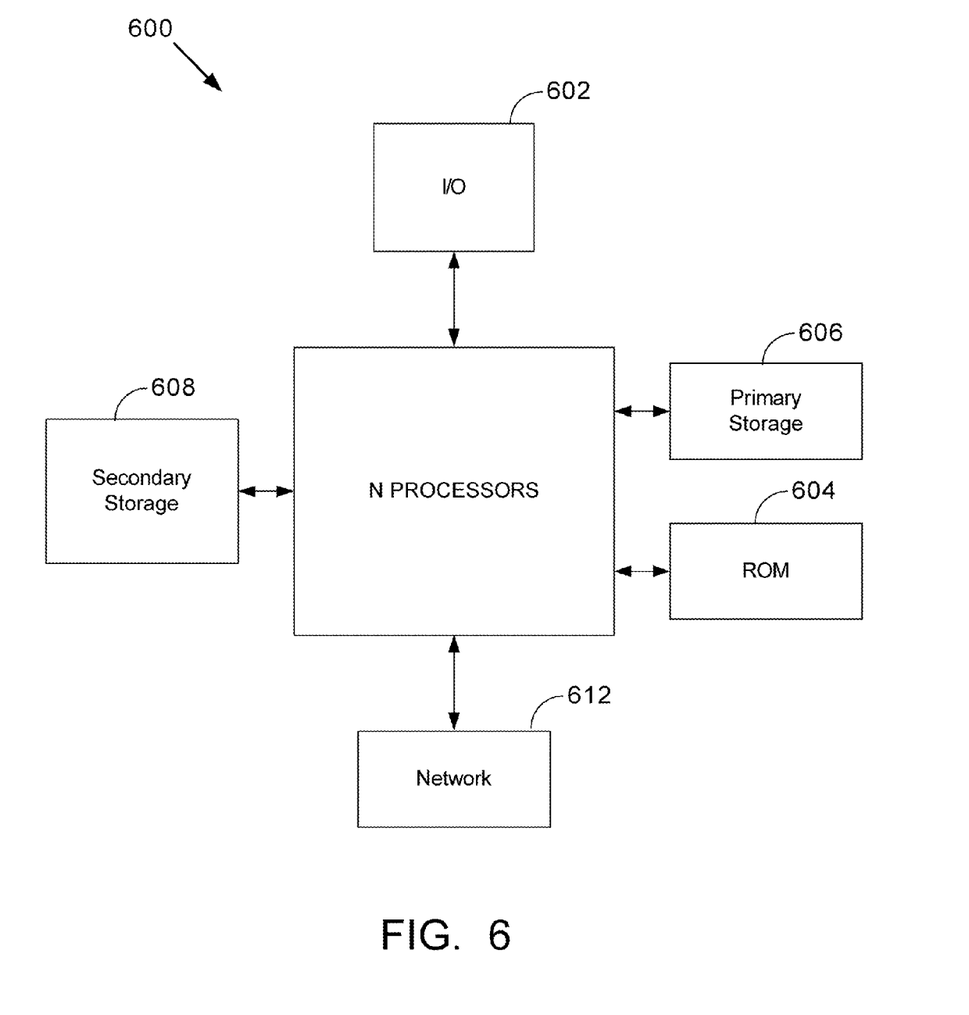
FIG. 6 illustrates a typical computer system that, when appropriately configured or designed, can serve as a computer system in which the invention may be embodied.

FIG. 6 illustrates a typical computer system that, when appropriately configured or designed, can serve as a computer system in which a controller module controlling the present invention may be embodied. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 may also be coupled to an interface 610 that connects to one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications or internet network using an external connection as shown generally at 612. With such a connection, it is contemplated that the CPU might receive information from the network, or might output information to the network in the course of performing the method steps described herein.

The present invention is suitable for many alternative applications beyond what has been described. In some applications, proper use of the present invention may help avoid false stolen car report to the police and insurance companies because the driver simply forgot where his or her car was parked. Moreover, if the car was actually stolen or towed away, the user of the present invention would have a definite record of where the car was actually parked. Car manufactures that want to add embodiments of the present invention as an amenity to their cars for the benefit of their prospective buyers.

Having fully described at least one embodiment of the present invention, other equivalent or alternative methods of car relocation and parking timing according to the present invention will be apparent to those skilled in the art. The invention has been described above by way of illustration, and the specific embodiments disclosed are not intended to limit the invention to the particular forms disclosed. For example, the particular implementation of the messaging system may vary depending upon the particular type technology used. For example, the present invention may be adapted to include a digital camera or global positioning system (GPS) to record (e.g., by picture or GPS coordinates) and/or visually track the location of the car in addition to or instead of the recorded voice or a textual message. Those skilled in the art may modify the prompt system in any suitable manner depending on the needs of the particular application; including, by way of example and not limitation, having no prerecorded announcements. For example, in an integrated GPS example, the cross streets nearest to the vehicles location may be automatically recorded into the present invention (without any prompting to or from the driver) and communicated by textual display or speech, for example, upon request by the driver. The car relocation and parking timer described in the foregoing were directed to car remote control implementations; however, similar techniques apply to a multiplicity of other applications (by way of example, and not limitation, car security remote controls, etc), wherein such alternative implementations of the present invention are contemplated as within the scope of the present invention. The invention is thus to cover all modifications, equivalents, and alternatives falling within the spirit and scope of the following claims.

What is claimed is:

1. A portable apparatus for car relocation by a person, the apparatus comprising:
    a car location recording module that is operable to record a car location, said car location recording module being initiated upon the engagement of a car related signal, said car related signal being engaged proximal to when the car is vacated;
    a timekeeper module to provide date and time of day information to said car location recording module and a parking timing function where the person inputs a first period of time corresponding to a remaining time on a parking meter and said timekeeper module provides an early warning signal when a second period of time equal to said first period of time minus a selected period of time has expired and further provides an alarm signal when said first period of time elapses;
    a car location playback module to playback the car location recorded by said recording module;
    a controller module to control recording in said car location recording module and playback in said car location playback module, said controller module configured to provide code/password protection of said playback; and
    a portable casing that substantially contains said car location recording module, said car location playback module, and said controller module.

2. The car relocation apparatus of claim 1, further comprising a hinged cover pivotally mounted to said portable casing to cover at least a portion of a surface of said portable casing.

3. The car relocation apparatus of claim 1, further comprising a prompting system to request the person record the location of the car into said car location recording module.

4. The car relocation apparatus of claim 1, further comprising a microphone system operable to record the person's voice into said car location recording module, said car location recording module being operable to record human voice.

5. The car relocation apparatus of claim 1, wherein said car location playback module is operable to play human voice.

6. The car relocation apparatus of claim 1, wherein said car related signal is automatically engaged proximal to when the car is vacated.

7. The car relocation apparatus of claim 1, wherein said car related signal is a wireless car door lock signal.

8. The car relocation apparatus of claim 1, wherein said car related signal is a wireless car alarm arming signal.

9. The car relocation apparatus of claim 1, further comprising an exposed textual display module to display the location of the car recorded into said car location recording module.

10. The car relocation apparatus of claim 1, further comprising a camera that records a picture of the location of the car into said car location recording module.

11. The car relocation apparatus of claim 1, further comprising a GPS system that automatically records the geographic coordinate location of the car into said car location recording module.

12. The car relocation apparatus of claim 1, further comprising a GPS system that automatically records the cross street location of the car into said car location recording module.

13. The car relocation apparatus of claim 1, further comprising means for starting recording in said car location recording module.

14. The car relocation apparatus of claim 1, further comprising means for ending recording in said car location recording module.

15. The car relocation apparatus of claim 1, further comprising means for starting playback in said car location playback module.

16. The car relocation apparatus of claim 1, further comprising means for ending playback in said car location playback module.

17. The car relocation apparatus of claim 1, wherein said location recording module is configured to also record the date and time of when the car location was recorded.

18. The car relocation apparatus of claim 1, wherein said code/password protection is programmed by the person.

19. A portable apparatus for car relocation by a person, the apparatus comprising:
   means for keeping time and determined time intervals;
   means for providing an early warning signal and an alarm signal at said determined time intervals;
   means for recording a car location;
   means for playing back the car location recorded by said car location recording means;
   means for controlling said car location recording and playback means; and
   means for encasing said car location recording, playback, and controlling means.

20. The car relocation apparatus of claim 19, further comprising means for covering at least a portion of a surface of said encasing means.

21. The car relocation apparatus of claim 19, further comprising means for prompting the person to record the location of the car into said car location recording means.

22. The car relocation apparatus of claim 19, further comprising means for communicating to the person the location of the car recorded into said car location recording means.

23. The car relocation apparatus of claim 19, wherein said location recording means is configured to also record the date and time of when the car location was recorded.

24. A method for the relocation of a car by a person, the method comprising the steps of:
   keeping time;
   recording a car location and said time in response to an engagement of a car related signal, said car related signal being engaged proximal to when the car is vacated;
   starting a parking timer in response to a parking meter duration time input by the person;
   issuing an early warning signal when a period of time equal to said parking meter duration minus a predetermined period of time elapses;
   issuing an alarm signal when said parking meter duration time elapses;
   communicating the recorded car location to the person; and
   controlling said recording and said communicating, said controlling providing code/password protection to said communicating.

25. The car relocation method of claim 24, further comprising the step of, in response to the engagement of a car related signal, prompting the person to record the location of the car.

26. The car relocation method of claim 24, wherein the recording of the car location is by way of recording the voice of the person saying the car location.

27. The car relocation method of claim 24, wherein the recording of the car location is by way of a GPS system that automatically records the approximate geographic coordinates of the car or nearest cross street location to the car.

28. The car relocation method of claim 24, wherein the communicating is by way of displaying the location of the car on an alphanumeric or graphic display.

29. The car relocation method of claim 24, wherein the communicating is by way of displaying an image related to the location of the car.

30. The car relocation method of claim 24, wherein the communicating is by way of playing back a voice recording.

31. The car relocation method of claim 24, wherein the communicating is by way of playing back a computer generated voice.

32. The car relocation method of claim 24, wherein the communicating comprises the communication of the cross streets nearest to the location of the car.

\* \* \* \* \*